United States Patent Office 3,597,156
Patented Aug. 3, 1971

3,597,156
DESTRUCTION OF AMMONIUM SALTS IN STRONG HYDROCHLORIC ACID SOLUTIONS
Leon E. Solomon, Sarnia, Ontario, Canada, assignor to The Dow Chemical Company, Midland, Mich.
No Drawing. Filed June 4, 1969, Ser. No. 830,528
Int. Cl. C01b 7/08, 24/00
U.S. Cl. 23—154                                6 Claims

ABSTRACT OF THE DISCLOSURE

A process for reducing the concentration of ammonium chloride in hydrochloric acid comprising dissolving chlorine in the aqueous solution.

BACKGROUND OF THE INVENTION

Chlorine, when produced electrolytically, frequently contains several parts per million (p.p.m.) of hazardous nitrogen trichloride ($NCl_3$). The trichloride can be removed by passing the chlorine through a scrubbing column containing relatively concentrated hydrochloric acid. The $NCl_3$ is reacted with the acid to form ammonium chloride. The resulting $NH_4Cl$-contaminated acid solution cannot be utilized further in chlorine production. Usually it is neutralized with caustic and discarded. If the ammonium impurity was eliminated, however, the ammonium-free acid solution could be recycled to acidify brine entering the chlorine-producing electrolytic cells. This would eliminate complex disposal problems and reduce the acid and caustic costs incurred in chlorine production.

An object of the present invention is to provide a process for greatly reducing or substantially eliminating ammonia-based impurities, e.g., ammonium chloride, from acid solutions thereof.

DESCRIPTION OF THE INVENTION

The present invention comprises chlorinating an aqueous solution comprising from about 1 to about 18 weight percent of hydrogen chloride and contaminating amounts of ammonium chloride. Generally but not necessarily the solution to be chlorinated also contains minor amounts of impurities such as carbon tetrachloride, hexachloroethane and chloroform. The term "chlorination" as employed in the present application refers to the act of dissolving chlorine, e.g., dispersing chlorine gas or water-soluble hypochlorites (e.g., NaClO) in the acid solution.

Upon chlorination, the time rate of reduction in ammonium chloride concentration is dependent upon the concentrations in the aqueous solution of chlorine, ammonium chloride and hydrogen chloride. If the concentration of HCl is from 1 to 18 percent by weight, the rate of decrease in $NH_4Cl$ can be accelerated by increasing the amount of chlorine present.

For efficient reduction in ammonium chloride concentration, at least stoichiometric amounts of chlorine must be present in relation to ammonium chloride or other ammonium species present in the acid solution. For present purposes, the reaction of chlorine with ammonium chloride is presumed to be:

$$2NH_4Cl + 3Cl_2 \rightarrow N_2 + 8HCl$$

Accordingly, at least 1.5 equivalents of dissolved chlorine are required to react with each equivalent of ammonium chloride.

The present invention is operable at all commonly encountered levels of $NH_4Cl$ concentration. When the treated solutions are substantially saturated with respect to chlorine, the purification rate will be accelerated, and solutions containing relatively large amounts of ammonium chloride are easily treated. However, when the initial $NH_4Cl$ concentration is high, e.g., in excess of about 5,000 parts per million (p.p.m.), it is difficult to dissolve enough chlorine gas to reach stoichiometric levels, and the purification rate is reduced.

Another factor affecting purification rate is the concentration of HCl in the acid. If the weight percent of hydrogen chloride exceeds about 18 percent or is less than about 1 percent, the rate of purification is reduced. Preferably, the concentration of HCl is from 2 to 17 percent by weight. Optimum results are obtained where the HCl concentration is from 5 to 15 percent by weight. The temperature of the acid solution during dissolution of chlorine or hypochlorite therein is not critical.

Exposure of the chlorinated solution to actinic radiation improves the rate of purification but is not essential to operability of the process. It is preferred to place the chlorinated solution in a translucent or transparent container exposed to actinic radiation such as is present in sunlight.

Preferably, in carrying out the process, the initial concentration of $NH_4Cl$ will be less than about 5,000 p.p.m. The initial hydrochloric acid concentration will be from about 5 to about 15 percent by weight, and the initial chlorine concentration will be from about 0.1 to about 7 grams per liter.

The following examples are set forth to illustrate the invention.

EXAMPLE 1

Five hundred cc./minute of chlorine gas was sparged through 1000 grams of a 15 percent (by weight) aqueous solution of HCl. 0.3 gram of ammonium chloride was added so that the initial solution concentration of $NH_4Cl$ was 300 parts per million (p.p.m.). The solution was analyzed by the indophenol method to determine $NH_4Cl$ concentration at the end of 4, 24 and 96 hours. The method of analysis is described by De Vries et al., J. Am. Water Works Assoc. 54, 858–60 (1962). The results of the analysis are set forth in Table I.

TABLE I

| P.p.m. $NH_4Cl$: | Time elapsed (hours) |
|---|---|
| 300 | 0 |
| 200 | 4 |
| 1.8 | 24 |
| 0 | 96 |

EXAMPLE 2

A 1000 ml. aliquot of chlorinated aqueous solution of HCl was prepared and contacted with $Cl_2$ gas, as in Example 1. The solution was divided into four portions. Each portion was diluted with different quantities of a non-chlorinated 15% HCl solution. The chlorine concentration of the diluted solutions was 0.39, 0.96, 2.02 and 4.5 g./liter of chlorine respectively. Sufficient ammonium chloride was added so that the initial concentration of $NH_4Cl$ in each solution was about 600 p.p.m.

The solutions were allowed to stand for about 70 hours. After this period, the $NH_4Cl$ content was determined by the indophenol method as in Example 1. The results are set forth in Table II.

TABLE II

| | Initial concentration of $NH_4Cl$ (p.p.m.) | Final concentration of $NH_4Cl$ (p.p.m.) |
|---|---|---|
| Chlorine concentration (g./liter): | | |
| 0.39 | 612 | 517 |
| 0.96 | 605 | 517 |
| 2.02 | 612 | 352 |
| 4.5 | 593 | 3.6 |

From Table II it can be seen that all levels of chlorination were effective in reducing $NH_4Cl$ concentrations,

EXAMPLE 3

Aqueous solutions of about 500 grams each were prepared wherein the HCl concentration by weight percent was 1, 2, 5 and 10%. Each solution was contacted for 90 minutes with 450 ml. per minute of chlorine gas. Ammonium chloride was added to each solution so that the initial $NH_4Cl$ concentration in each solution was about 600 p.p.m. The solutions were stirred for about 5 minutes to thoroughly disperse the $NH_4Cl$. The stirred solutions were then allowed to stand for periods of from 17.5 to 23.5 hours after which the $NH_4Cl$ concentration was determined. Analytical results are set forth in Table III.

TABLE III

|  | Initial $NH_4Cl$ concentration (p.p.m.) | Final $NH_4Cl$ concentration (p.p.m.) |
|---|---|---|
| Percent HCl concentration (by weight): |  |  |
| 1 | 593 | 67 |
| 2 | 613 | 12 |
| 5 | 609 | 0.6 |
| 10 | 599 | 0 |

From Table III it can be seen that HCl concentrations as low as 1 percent by weight are effective in reducing $NH_4Cl$ concentrations. At HCl concentrations above 5 percent, especially good results are achieved.

EXAMPLE 4

As in Example 3, solutions of HCl were prepared. The HCl concentration by weight was from 16.6 to 25.6 percent. Ammonium chloride was added to the solutions so that the initial $NH_4Cl$ concentration was in excess of about 350 p.p.m. After preparation the solutions were placed in stoppered white polyethylene bottles which were allowed to stand for 48 hours before analysis.

As a control, two non-chlorinated solutions were prepared wherein the HCl concentration was 19.0 and 16.6 percent respectively. The $NH_4Cl$ concentration of these solutions was also in excess of about 350 p.p.m. These solutions were also placed in polyethylene bottles and were allowed to stand for about 48 hours before being analyzed for $NH_4Cl$ content. During the 48 hour holding period both sets of solutions (chlorinated and non-chlorinated) resided in a room with windows and were subjected to similar amounts of light.

Analytical results are set forth in Table IV.

TABLE IV

|  | Final $NH_4Cl$ (p.p.m.) | Remarks |
|---|---|---|
| Percent HCl: |  |  |
| 25.6 | 420 |  |
| 24.0 | 412 |  |
| 21.3 | 405 |  |
| 19.0 | 111 |  |
| 16.6 | 18 |  |
| 19.0 | 415 | No $Cl_2$ added. |
| 16.6 | 420 | Do. |

EXAMPLE 5

Two aqueous aliquot solutions (each having a volume of about 5 gallons) were chlorinated in a manner to Example 1. Each solution contained 360 p.p.m. ammonium chloride, 15 weight percent hydrochloric acid, and about 7 g./liter of chlorine. The solutions were placed in polyethylene containers. One solution was kept in darkness while the other was exposed to bright sunlight. At the end of 120 minutes, analysis (by the indophenol method) of the solution subjected to sunlight showed an ammonium chloride concentration of less than 5 p.p.m. Similar analysis of the other solution showed ammonium chloride concentration of 310 p.p.m.

What is claimed is:

1. A process for purifying an aqueous solution of hydrochloric acid comprising 1 to 18 weight percent hydrogen chloride by reducing the concentration of ammonium chloride present therein as a contaminant and wherein said concentration of ammonium chloride in the impure hydrochloric acid solution is less than about 5,000 parts per million, which comprises chlorinating the aqueous hydrochloric acid solution, said chlorination being sufficient to dissolve essentially 1.5 equivalents of chlorine for every equivalent of ammonium chloride present therein and to convert the ammonium chloride to form nitrogen and hydrochloric acid, allowing the solution to settle for at least several hours, and recovering the purified hydrochloric acid solution of substantially decreased ammonium chloride content.

2. The method of claim 1 wherein the acid solution contains from 2 to 17 percent HCl.

3. The method of claim 1 wherein the solution contains from 5 to 15 percent HCl.

4. The method of claim 1 wherein the initial chlorine concentration in the chlorinated solution is from 0.1 to 7 grams per liter.

5. The method of claim 1 wherein the acid solution is substantially saturated with chlorine.

6. The method of claim 1 wherein the rate of purification is improved by including the step of exposing the chlorinated solution to actinic radiation.

References Cited

UNITED STATES PATENTS

| 2,787,523 | 4/1957 | Wilson | 23—154 |
| 2,787,525 | 4/1957 | De Witt | 23—154 |
| 3,103,419 | 9/1963 | Hunter et al. | 23—193X |
| 3,402,999 | 9/1968 | Botton et al. | 23—193 |

OTHER REFERENCES

C. A. Jacobson's book: "Encyclopedia of Chemical Reactions; vol. 5, 1953 ed., pages 118, 132 and 162. Chapman & Hall, Ltd., New York and London.

EDWARD STERN, Primary Examiner

U.S. Cl. X.R.

23—220